United States Patent [19]

Schokkenbroek

[11] 3,920,948
[45] Nov. 18, 1975

[54] METHOD FOR REPAIRING INGOT STOOLS

[75] Inventor: Jan Schokkenbroek, Alkmaar, Netherlands

[73] Assignee: Hoogovens Ijmuiden BV, Ijmuiden, Netherlands

[22] Filed: Jan. 2, 1974

[21] Appl. No.: 429,809

[30] Foreign Application Priority Data
Jan. 9, 1973 Netherlands............... 7300262

[52] U.S. Cl. ............... 219/76; 29/401.1; 164/92; 219/73; 228/119
[51] Int. Cl.²................................. B23K 9/04
[58] Field of Search .... 219/73, 76; 29/401.1, 401.2, 29/495; 164/92, 94; 228/119

[56] References Cited
UNITED STATES PATENTS

| | | | |
|---|---|---|---|
| 2,226,403 | 12/1940 | Hopkins | 219/76 X |
| 2,330,289 | 9/1943 | Keir | 219/76 |
| 2,653,212 | 9/1953 | Kinkead | 219/76 |
| 3,139,505 | 6/1964 | Kirschning | 219/73 |
| 3,204,077 | 8/1965 | Arnoldy | 219/76 |
| 3,221,135 | 11/1965 | Maier | 219/73 X |
| 3,286,334 | 11/1966 | Hay | 219/76 X |
| 3,624,345 | 11/1971 | Armstrong | 219/76 X |
| 3,659,075 | 4/1972 | Pellkofer | 219/73 X |

*Primary Examiner*—J. V. Truhe
*Assistant Examiner*—N. D. Herkamp
*Attorney, Agent, or Firm*—Stevens, Davis, Miller & Mosher

[57] ABSTRACT

A method of repairing a heavy iron article (for example, ingot stools and ingot moulds) in which metal of a composition substantially that of the metal of the article to be repaired (except for alloying components, flux, and covering substances) is supplied to the portion to be repaired. The metal supplied and portion to be repaired are electrothermally heated to render them molten for a substantial period of time by applying electrothermal power of at least 250 kVA adjacent the portion of the article to be assembled in a reducing environment for a part of the time and then the article is slowly cooled.

9 Claims, 4 Drawing Figures

METHOD FOR REPAIRING INGOT STOOLS

This invention relates to a method of repairing heavy iron articles, especially ingot stools and ingot moulds and to articles repaired by the method, and particularly relates to an improvement or modification of the process of published Dutch patent application no. 70.02530.

In the patent application numbered above, there is described a method for repairing heavy iron articles which is particularly, though not exclusively applicable to the repair of cast iron ingot stools and/or ingot moulds for the steel industry. In this method, metal is supplied to the repair zone, the metal supplied having substantially the same composition as the metal of the article at the repair zone (the metal supplied possibly including alloying components which may be added to correct its composition, and flux and covering substances which may also be supplied), and by means of at least one arc electrode sufficient electrothermal energy is developed in the repair zone to maintain all the metal supplied and at least some adjacent metal of the article being repaired simultaneously molten for a substantial period of time, after which the repair zone is slagged off and the article is cooled slowly. The metal supplied to the zone being repaired is preferably in the form of solid pieces.

In the production of steel ingots as an intermediate product to be used subsequently in steel sheet rolling mills, ingot moulds are placed on flat ingot stools and liquid steel is poured into them. After the steel has sufficiently cooled down the ingot moulds are pulled from the solidifed ingots, and the ingots are pulled from the ingot stools. The ingot stools themselves are plain slabs with a weight of for instance from 6 to 9 tons and a thickness of for instance 400mm. Other weights and dimensions for ingot stools, however, are also known. As a rule ingot stools are made from cast iron or from pig iron.

At the beginning of the casting process the stream of liquid steel falls into the ingot mould and impinges first on the top surface of the ingot stool. This results in erosion and corrosion of this top surface so that after use of the ingot stool for several castings a depression has been formed in it. As this depression increases in dimensions, the steel ingots cast on the stool gradually become less and less suited for further processing. In particular ingots with excessively convex protruding parts in their undersurface are not suitable to be stood upright on this surface, so that it becomes impossible to place them in soaking pit furnaces. Moreover such excessively convex undersurfaces give rise to lower efficiency and lower useful output of the slabs rolled from the ingots. It has appeared that an ingot stool is unsuitable for use if the depression formed has a depth of about 18 cm, or if the depression has become extended to such horizontal dimensions that it reaches the zone where the ingot mould rests upon the ingot stool. On rejection of an ingot stool this means that a quantity of iron of an order of magnitude of 500kg will have been entirely wasted and that the remainder of the ingot stool should be valued for its scrap value only. Although it is possible that there are considerable differences in these losses between one plant and another, the losses will almost always be about 0.2 to 0.4 percent of the value of the raw steel manufactured by casting with the aid of such ingot stools.

In Dutch patent application no. 70.02530 a new method is described for the repair of damaged ingot stools in which, in brief, by means of an arc electrode the entire damaged zone is melted and is kept in a molten condition simultaneously together with metal which has been supplied as a filling for the damaged zone. It was found at that time that by this new method it was possible to repair ingot stools so that the repaired stools could as a rule be used in a similar way to new ingot stools. However it has since been found that under certain special conditions the repaired ingot stools become damaged in less time than originally new ingot stools. In particular this is the case if ingots stick to the ingot stool, and have to be stripped off with considerable force.

It should be noted that other methods have previously been proposed for repairing damage in for instance ingot stools. In this connection the following specifications for instance may be mentioned; U.S. patent specification no. 2,330,289, Swiss patent specification no. 355,878 and Belgian patent specification no. 542,628. In all places in this prior literature and at all times methods were however described in which different parts of the damaged surface were successively and gradually and partially rendered molten and repair material was supplied to the molten part. Nowhere in this prior literature has it been suggested to keep the entire region of the damaged zone and the material supplied for repair molten simultaneously and for a certain period of time, and to cool thereupon the entire construction gradually.

With a view to combatting the drawbacks which may at times appear in the application of the method according to Dutch patent application no. 70.02530 there is now proposed an improvement or modification of that method, which consists in that electrothermal power of at least 250kVA is developed at the repair zone in a reducing, preferably strongly reducing, environment.

Upon further investigation it has been found that a transition zone between the original material and the material added in the repair can be responsible when applying the method according to Dutch patent application no. 70.02530, for the occurence of damage in the ingot stool in the event of sticking ingots. This transition zone appeared to contain relatively large amounts of iron oxides which were responsible for local weak spots in the ingot stool. In the present invention, as a consequence of the greater quantity of electrothermal heat developed, in combination with the presence of a reducing environment two effects may now be obtained. Firstly reduction of the iron oxides which are present on top of the damaged ingot stool can take place, and secondly because of the more violent course of the melting process the transition zone is of so much greater dimensions that it may hardly be recognizable anymore as such.

It was found that best results can be obtained if the reduction of the iron oxides present on the ingot stool is achieved that the use of a reducing environment which at the location at which the heat is developed is maintained at a temperature of at least 1500°C and for very heavy objects preferably at 2300° to 2600°C.

The average power developed when power is on during the repair is preferably more than 250 kVA. Preferably also, the said electrothermal power of at least 250 kVA is developed in the reducing environment for a substantial period of time at least before the said metal is supplied to the repair zone, with the aim of achieving reduction of the oxides. Furthermore, in order to achieve the desired considerable heating of the molten bath containing the metal supplied for repair and adjacent metal of the article, it is desirable that the said electrothermal power of at least 250 kVA is developed in the reducing environment after the said metal is supplied to the repair zone.

The reducing environment can be obtained in different ways, for instance as a reducing atmosphere by means of reducing protective gasses, or by performing the entire repair within a furnace in the interior of which a reducing gas atmosphere is maintained. These possibilities however, may in practice be found objectionable for technical and economic reasons. We therefore prefer a method in which the reducing environment is obtained by providing granular material around the electrode on top of the article so that said granular material produces a reducing gas at the operational temperature. For instance coal can be used for this purpose, but coke, because it is a clean, cheap and easily handled material is, however, preferred. As a consequence of the heat generated inside the mass of coke, the coke starts to glow, which results in the development of carbon monoxide gas which participates in the process as a reducing agent. It should be noted that the heat generated is mainly generated by the electrical current through the heap. In fact hardly a single arc flame is present. To obtain a source of heat with dimensions of the same order of magnitude as those of the damaged zone, and also in order to achieve the required intensity of electrical current, an electrode having a diameter in the range 30 to 40cm is preferred.

Good results may be obtained if a heap of coke having a height of about 80cm and a diameter of about 100cm is built around the electrode or electrodes and electric current is maintained until the general area of the damaged zone is molten, and reduced if necessary, after which the electrode or electrodes are withdrawn from the heap of coke, and through the resulting opening the repair metal, e.g. iron, and alloying and flux materials as required are supplied, after which the electrode or electrodes are lowered again, electric current being maintained for a total period of at least about 2 hours after the lowering of the electrode or electrodes.

Figure 1:
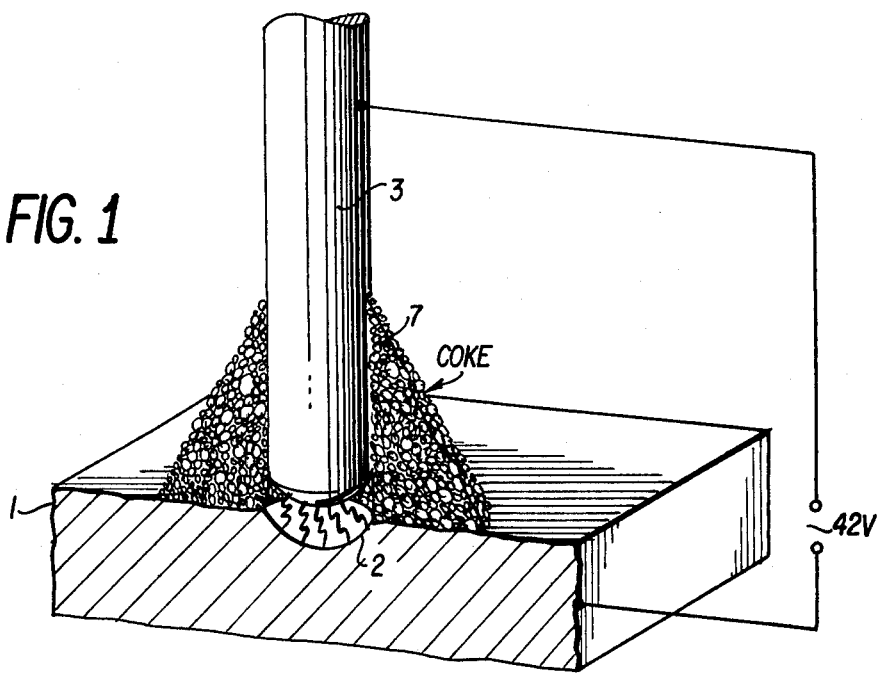
FIG. 1 is a perspective view partly in section of an ingot stool to be repaired with the electrode lowered and a heap built therearound.
Figure 2:
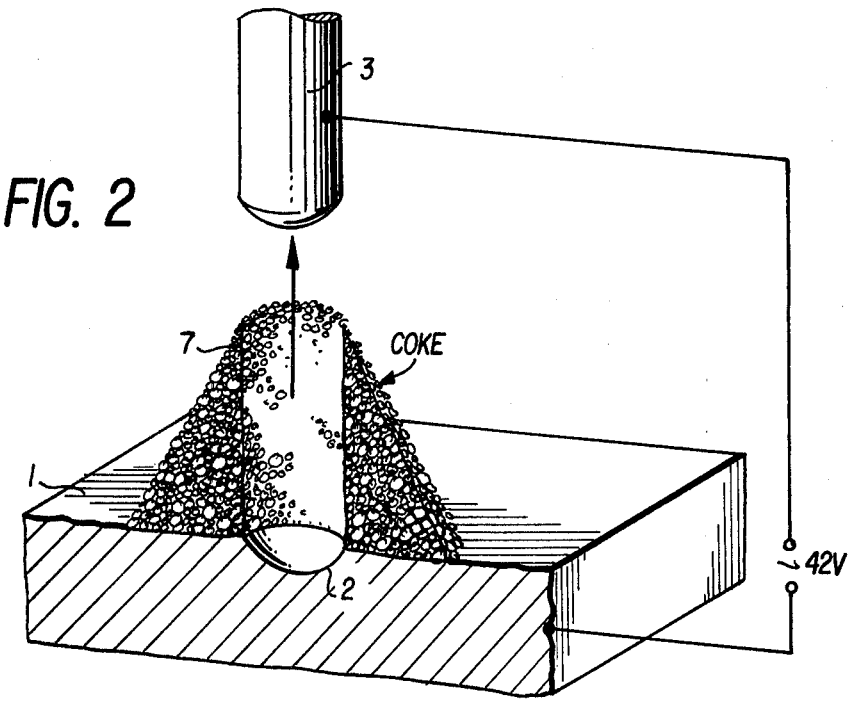
FIG. 2 is a view similar to FIG. 1 but showing the electrode lifted outside the coke mass.
Figure 3:
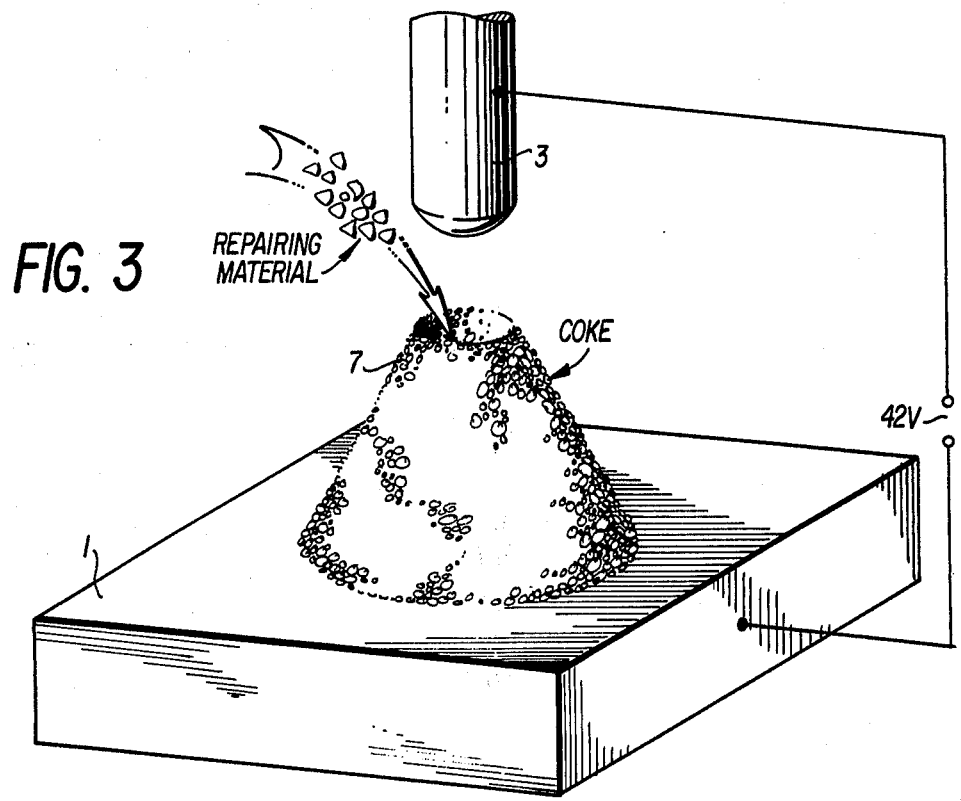
FIG. 3 is a perspective view showing the repairing metal being added.
Figure 4:
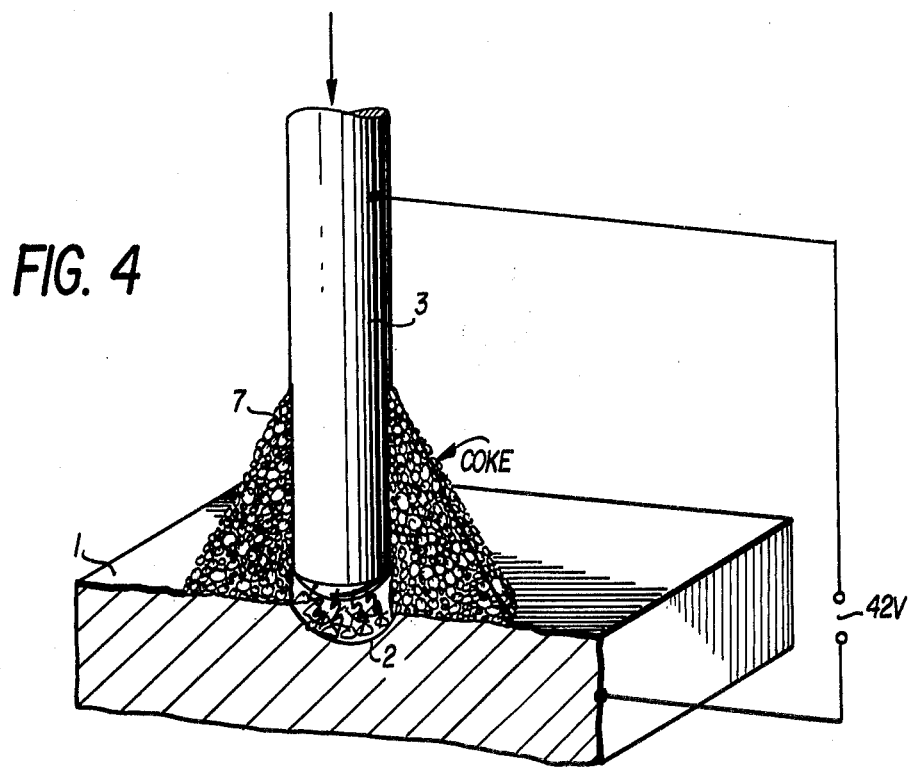
FIG. 4 is a perspective view partly in section showing the electrode lowered.

One Example of a process embodying the present invention will now be given:

Example: A cast iron ingot stool 1, with a weight of 9 tons and a thickness of 40cm, was repaired after about 200kg. of iron had been removed from its surface. The surface of the cavity 2 thus generated was first cleaned by means of a reducing gas flame. Then a graphite electrode with a diameter of 35cm was positioned with its lower end above the cavity at a distance which was suitable for striking an arc. A heap of coke 7 (FIG. 1) was built around the electrodes and upon the ingot casting stool 1, the heap having a diameter of about 1 m and a height of 80 cm, after which electric current was switched on. With a voltage of 42 volts, a current of 7500 amperes (315 kVA) was selected. After some time the entire coke mass had started to glow, whereupon an additional supply of coke was provided to keep the outside of the coke mass remain dark. At this time the electrode (FIG. 2) was lifted outside the coke mass, which then was found to have sufficiently sintered to leave an opening corresponding to the dimensions of the electrode. Through this opening a temperature above the damaged zone of about 2500°C could be measured. Then pigs of iron, pieces of scrap and other corrective components such as FeSi and FeMn, and further flux and covering substances were supplied through the opening, as shown in FIG. 3, and the electrode was lowered again as shown in FIG. 4.

Next the electric current was switched on again at the same level as before and maintained for, in total, about 3 hours.

The power developed was sufficient to keep all the repair metal supplied and a surrounding zone of the ingot stool molten simultaneously. After slagging off, the ingot stool was cooled slowly. In the end a repaired ingot stool was obtained which could meet the highest demands to be put upon new stools.

What we claim is:

1. A method of repairing a heavy metal article comprising the sequential steps of:
    electrothermally heating the portion of the article to be repaired by applying electrothermal power adjacent the portion of the article to be repaired in a reducing environment,
    supplying metal to the portion of the article to be repaired, said metal being of a composition substantially that of the metal of the article to be repaired except for alloying components, flux, and covering substances,
    electrothermally heating the metal supplied and the portion of the article to be repaired to render them molten for a substantial period of time by applying electrothermal power of at least 250 kVA adjacent the portion of the article to be repaired while maintaining the reducing environment for at least a substantial part of the time, and then
    slowly cooling the article.

2. The method of claim 1 wherein:
    the reducing environment in which said electrothermal power of at least 250 kVA is applied is maintained thereby at a temperature of at least 1500°C for a substantial period of time.

3. The method of claim 2 wherein:
    the temperature at which the reducing environment is maintained is in the range 2300°C to 2600°C.

4. The method of claim 1 wherein:
    the electrothermal power applied in the reducing environment before the metal is supplied is at least 250 kVA.

5. The method of claim 1 further comprising the step of:
    supplying granular material to the portion of the article to be repaired, the granular material producing a reducing gas upon said heating to produce the reducing environment.

6. The method of claim 5 wherein:

the granular material is coke.

7. The method of claim 6 wherein:

said power is applied by means of an electrode adjacent the portion of the article to be repaired, said coke is supplied in a large volume around the electrode, said power is applied until the portion of the article to be repaired is molten, then said electrode is removed from the coke to leave a hole therein, then said metal is supplied as aforesaid, then the electrode is returned to its position adjacent the article to be repaired and said power is again applied for at least about 2 hours.

8. The method of claim 1 wherein said article is a cast iron ingot stool.

9. The method of claim 1 wherein said article is a cast iron ingot mould.

* * * * *